(12) United States Patent
Pieri

(10) Patent No.: US 8,123,441 B2
(45) Date of Patent: Feb. 28, 2012

(54) METHOD AND APPARATUS FOR CARRYING OUT DEEP HOLES AND/OR BOTTLE-BORING

(75) Inventor: Giovanni Pieri, Palermo (IT)

(73) Assignee: Magnaghi Aeronautica S.p.A., Naples (IT)

( * ) Notice: Subject to any disclaimer, the term of this patent is extended or adjusted under 35 U.S.C. 154(b) by 1262 days.

(21) Appl. No.: 11/605,476

(22) Filed: Nov. 29, 2006

(65) Prior Publication Data
US 2007/0147967 A1    Jun. 28, 2007

(51) Int. Cl.
B23B 35/00    (2006.01)

(52) U.S. Cl. .................. 408/1 R; 82/1.11; 408/80

(58) Field of Classification Search ............ 408/1 R, 408/22, 23, 31, 79–83.5, 201; 82/1.11, 1.2, 82/1.4
See application file for complete search history.

(56) References Cited

U.S. PATENT DOCUMENTS

| | | | | |
|---|---|---|---|---|
| 807,755 A * | 12/1905 | Loyd | | 408/81 |
| 810,114 A * | 1/1906 | Gouldsberry | | 408/82 |
| 1,126,715 A * | 2/1915 | Cuyler | | 408/79 |
| 1,561,463 A * | 11/1925 | De Rochemont | | 408/201 |
| 1,923,847 A * | 8/1933 | Seelert | | 408/83.5 |
| 1,964,970 A * | 7/1934 | Albertson | | 408/232 |
| 2,014,679 A * | 9/1935 | Eckreate | | 408/57 |
| 2,230,639 A * | 2/1941 | Calcagni | | 409/309 |
| 2,392,564 A * | 1/1946 | Wrenn | | 408/111 |
| 2,873,632 A * | 2/1959 | Bissey | | 408/57 |
| 3,333,487 A * | 8/1967 | Parry | | 408/80 |
| 4,043,695 A * | 8/1977 | Gottelt | | 408/1 R |
| 4,053,249 A * | 10/1977 | Ness et al. | | 408/1 BD |
| 4,571,129 A * | 2/1986 | Strand | | 408/54 |
| 4,640,373 A | 2/1987 | Horsch et al. | | |
| 4,940,370 A * | 7/1990 | Gipson | | 408/72 R |
| 5,001,871 A * | 3/1991 | Harmand | | 451/431 |
| 5,062,187 A * | 11/1991 | Bromley | | 29/33 T |

FOREIGN PATENT DOCUMENTS

| | | |
|---|---|---|
| DE | 767 138 C | 11/1951 |
| DE | 196 05 069 A1 | 8/1997 |
| JP | 57201109 A  * | 12/1982 |
| JP | 57201111 A  * | 12/1982 |
| JP | 11129108 A  * | 5/1999 |
| SU | 573265 A  * | 10/1977 |

OTHER PUBLICATIONS

EP Search Report of EP 05 42 5869, completed Jul. 5, 2006.

* cited by examiner

*Primary Examiner* — Daniel Howell
(74) *Attorney, Agent, or Firm* — Nixon & Vanderhye P.C.

(57) ABSTRACT

A method for carrying out deep holes and/or bottle-boring, in particular borings, with a high ratio between final linear depth and hole diameter, higher than 14:1, comprises the steps of: carrying out a reference hole, having axis and diameter linked to the deep hole to be carried out by a predetermined spatial relationship; making a deep hole of a diameter smaller than the hole to be carried out, so that said reference hole and said first deep hole be in spatial communication; and prearranging a guiding and supporting element internal to said reference hole and connecting thereto a tool shaft and a related tool to obtain a contour internal to the deep hole and/or a deep hole of diameter and axis according to said predetermined spatial relationship.

5 Claims, 5 Drawing Sheets

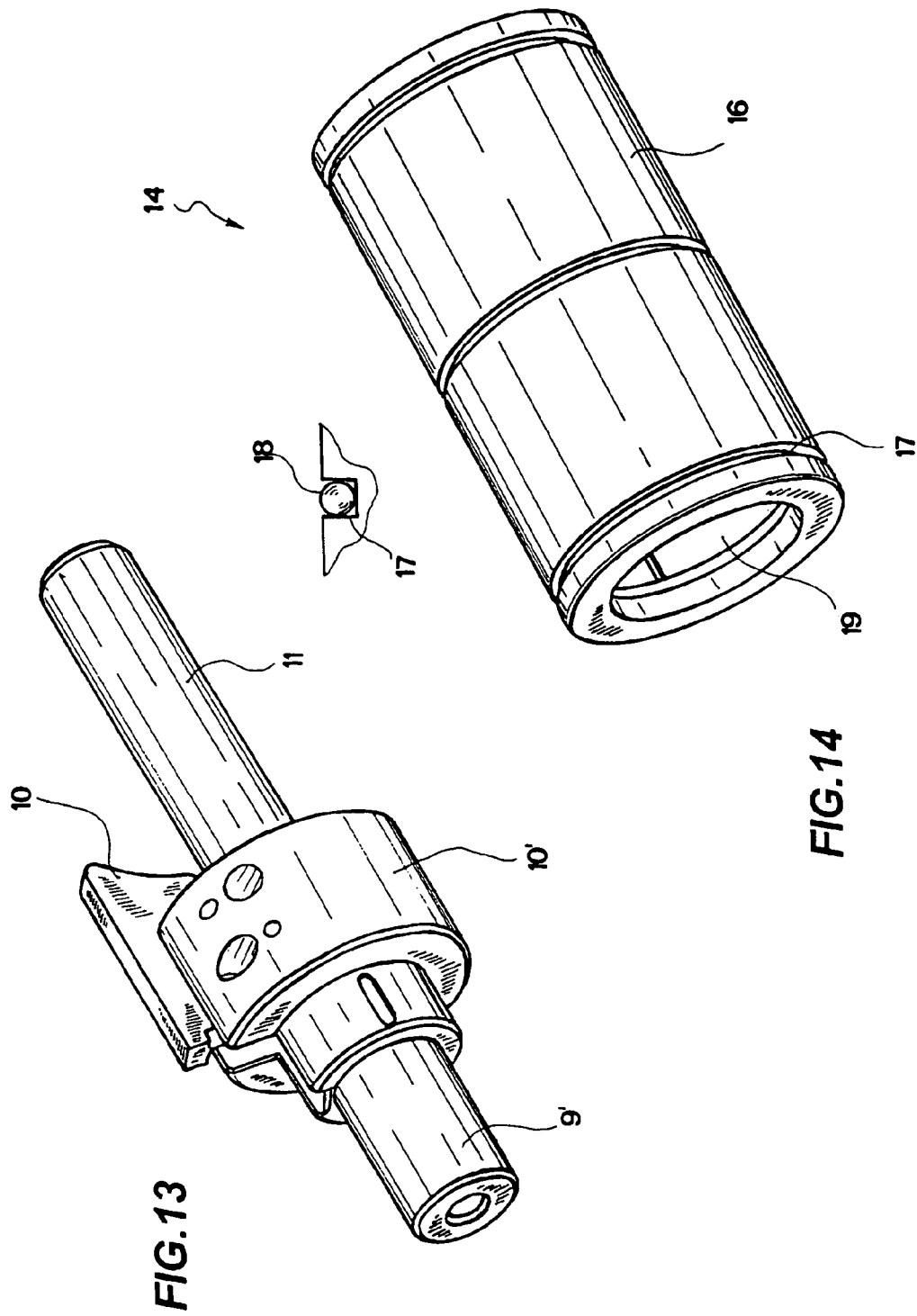

METHOD AND APPARATUS FOR CARRYING OUT DEEP HOLES AND/OR BOTTLE-BORING

BACKGROUND OF THE INVENTION

1. Field of the Invention

The present invention refers to a method and a related apparatus for carrying out deep holes and/or bottle-boring, in particular in the field of high-precision machining, above all in the presence of a thin wall.

Such method and apparatus find specific application in boring, which consists in carrying out a longitudinal hole in a solid cylinder, to obtain a seamless tubular hollow cylinder. The so-called bottle-boring consists in a specific boring, in which the inside diameter (bore) of the longitudinal hole is greater than the diameter of the hole at the top of the cylinder, so that the hole has a shape resembling that of a bottle.

However, it is understood that the present invention may generally be applied to the carrying out of deep holes, where the ratio between final linear depth and hole diameter has a high value, e.g. higher than 10:1.

2. Description of the Prior Art

The boring is carried out by a tool covering a longitudinal distance with respect to the workpiece, supported by a tool shaft of appropriate length. The machining may be carried out on a lathe, where the workpiece to be bored is set in rotation with respect to the shaft or vice versa.

This kind of machining usually requires a high degree of accuracy, above all to ensure the perfect cylindricity and linearity of the hole that is carried out. Such a requirement is all the more difficult to meet the greater the depth of the hole, or the linear depth/hole diameter ratio.

Moreover, it should be considered that in several manufacturing processes even minimal deviations lead to the discarding of the workpiece, with a considerable economic loss in time, tool wear and often high-grade material.

In addition, difficulties are often enhanced by the end use of the hollow cylinders, envisaging the resistance to very high internal pressures and therefore requiring the use of specific metallic materials of difficult machining.

The carrying out of a bottle-boring further aggravates these overall difficulties.

All these difficulties prevented the carrying out of deep holes and borings with high depth/diameter ratios, e.g., higher than 14:1. In fact, with the increase of this parameter there increases the risk of tool shaft bendings and the transmission of vibrations therethrough.

To overcome this drawback, it has been proposed to make the shaft sturdier; yet, this contrivance, beside generally burdening the machining, may negatively influence the evacuation of the chips by the tool.

SUMMARY OF THE INVENTION

The technical problem underlying the present invention is to provide a method and an apparatus for carrying out deep holes overcoming the drawbacks mentioned with reference to the known art.

Such a problem is solved by a method as above specified, comprising the steps of:
  carrying out a first reference hole, having axis and diameter linked to the deep hole to be carried out by a predetermined spatial relationship;
  making a first deep hole of a diameter smaller than the hole to be carried out, so that said reference hole and said first deep hole be in spatial communication; and
  prearranging a guiding and supporting element internal to said first reference hole and connecting thereto a tool shaft and a related tool to obtain a contour internal to the deep hole and/or a deep hole of diameter and axis according to said predetermined spatial relationship.

According to an embodiment of the present method, the reference hole, in case of boring, may be carried out at the opposite end with respect to the access end of the deep hole to be carried out, said guiding and supporting element forming the coaxial extension of said tool shaft. In this case, the tool can be prearranged for finishing the contour of the bottom of the hole or for cutting the walls of the hole according to a cylinder coaxial to said reference hole.

According to a variant of the present method, the first deep hole coincides with said reference hole, and the guiding and supporting element is therefore crossed by said tool shaft, whereas the tool is apt to carry out a finishing of the walls of the deep hole or a widening (bottle-boring).

The combination of said variants allows to carry out a very deep hole, with a depth/diameter ratio equal to or even above 20:1, of great accuracy, with the bottom of the hole finished according to a predetermined contour and with a bottle-boring.

According to the same inventive concept, the present invention also refers to an apparatus as above specified, further comprising means for carrying out a reference hole; a set of guiding and supporting elements, suitable for being connected with the tool shaft and inserted into a reference hole; and a kit of tools for the chip-removal inside to a deep hole.

Hence, the main advantage of the method and of the apparatus according to the invention lies in allowing very deep holes, with remarkable features of accuracy and repeatability.

The present invention will hereinafter be described according to a preferred embodiment thereof, given by way of a non-limiting example, with reference to the annexed drawings.

BRIEF DESCRIPTION OF THE DRAWINGS

FIG. 13 is a perspective view of a first detail of the apparatus according to the invention;

FIG. 14 is a perspective view of a second detail of the apparatus according to the invention.

DESCRIPTION OF THE PREFERRED EMBODIMENT OF THE INVENTION

With reference to the figures, an embodiment of the method according to the invention envisages the boring of a solid cylinder 1 so as to carry out a deep hole with a depth/diameter ratio greater than or equal to 17:1.

Figure 1:
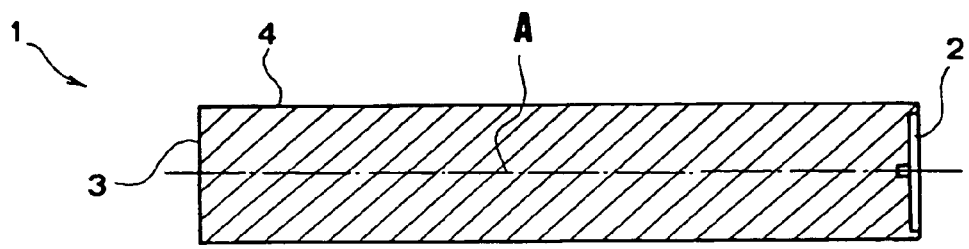
FIGS. 1 to 12 show a schematic and sectional view of a workpiece going through various steps for carrying out a deep hole and a bottle-boring according to the invention.

The solid cylinder 1, i.e. the workpiece, has (FIG. 1) a first end 2, at which there will be made the access of the deep hole, and a second opposite or bottom end 3, apt to form the bottom of the bored cylinder.

Moreover, it comprises a reference cylindrical outside surface 4, already suitably machined according to dimensional parameters predetermined and executed with great accuracy, and an axis A that will also be the axis of the deep hole to be carried out.

Figure 2:
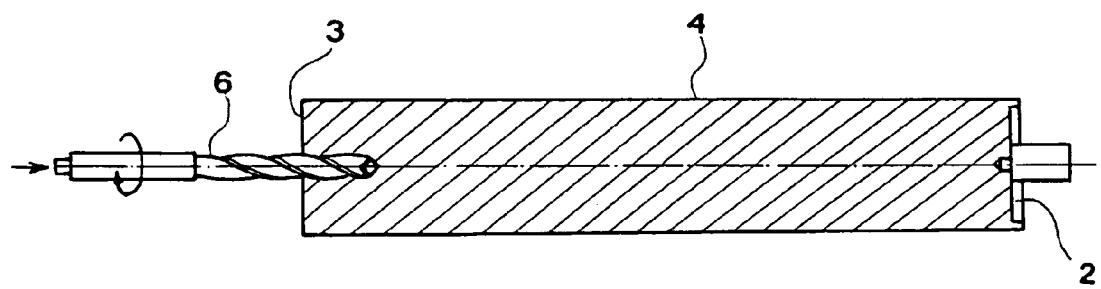

At said bottom end 3 it is carried out (FIG. 2) a first reference hole 5, of limited depth and predetermined diameter, exactly coaxial to the solid cylinder 1. This step may be carried out by a conventional drilling (of which it is shown the drill 6 employed) or a lathe, anyhow not shown as well-known to a person skilled in the art.

Figure 3:
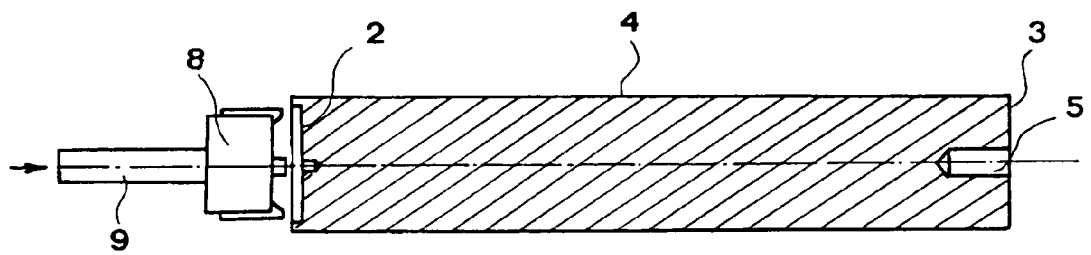

Subsequently (FIG. 3) the piece 1 is mounted on a suitable lathe and a first deep hole 7 is carried out by a first cutting tool 8 supported by a tool shaft 9.

Figure 4:
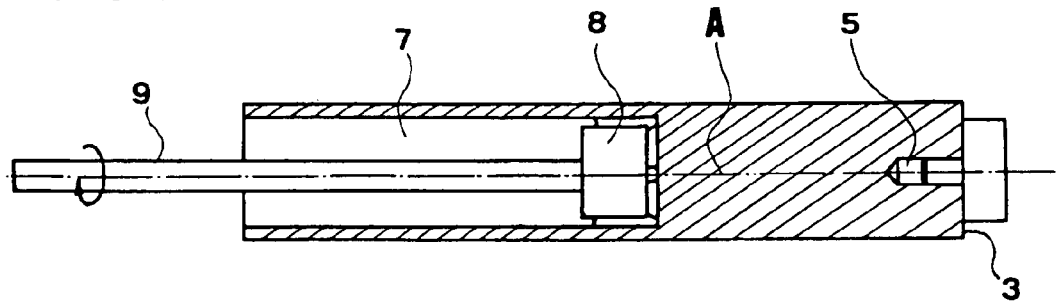

The first hole 7, carried out merely by longitudinally advancing the tool 8 (FIG. 4) may be characterised by a wide dimensional tolerance, the former being not the end hole but merely a mark (seat) thereof.

According to a variant, this hole may comprise the boring of a hollow cylinder, optionally provided with a cavity from the casting.

Figure 5:
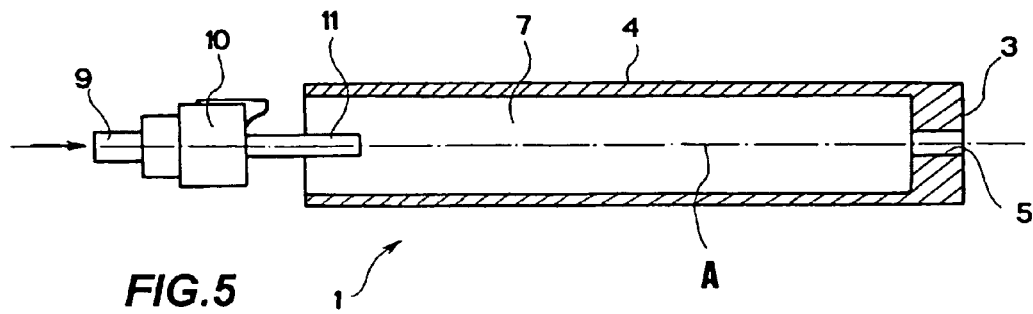

The first deep hole 7 should meet said first reference hole 5 (FIG. 5) so that they be communicating and, beyond their respective tolerance, coaxial.

Upon carrying out said first deep hole 7, thereinside it is inserted a second tool 10 supported by said shaft 9.

Moreover, it will be provided a first guiding and supporting element 11 that, in the present embodiment, is mounted onto the shaft 9 connected to the tool 10 so as to form the coaxial extension thereof.

Said element 11 is cylindrical, with a diameter basically corresponding to that of the reference hole 5. Moreover, it is made of low-friction material, e.g. a bronze alloy, or is suitably coated with a low-friction surface layer.

Figure 6:
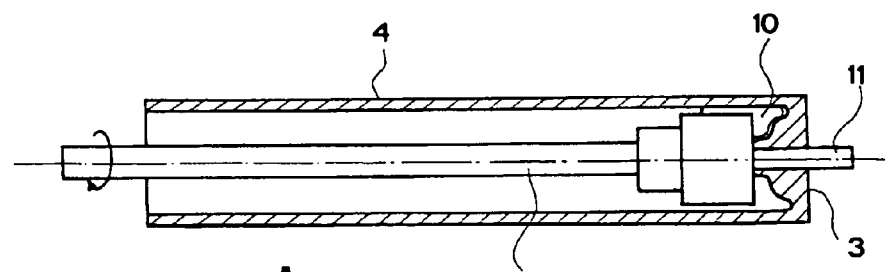

In fact, said guiding and supporting element 11 is intended for being inserted inside said reference hole 5 so as to make sure that the tool 10 and the shaft 9 keep their position exactly coaxial to the workpiece 1, to assure the utmost accuracy of machining (FIG. 6).

The tool 10 employed here may be suitable for giving a predetermined contour 12 to the bottom of the workpiece 1.

The former is mounted on a toolhead 10' in turn connected to a suitable mount 9' for removably connecting to the tool shaft 9 (FIG. 13).

Figure 7:
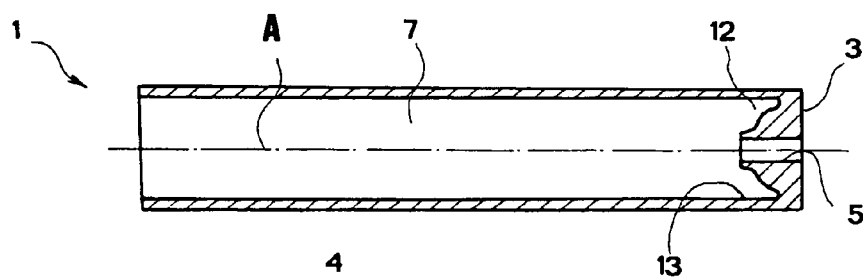

Another tool may be utilized to finish the cylindrical walls 13 of the hole 7 at said bottom (FIG. 7).

Upon completing the deep finishing of the hole 7, it is made ready a system for finishing the cylindrical walls of the hole 7, with the carrying out of the bottle-boring.

For this purpose, it is provided a second bush-shaped guiding and supporting element 14, suitable for being inserted onto the tool shaft 9, which, in turn, will be provided with a cutting head 15 for bottle-boring.

Figure 8:
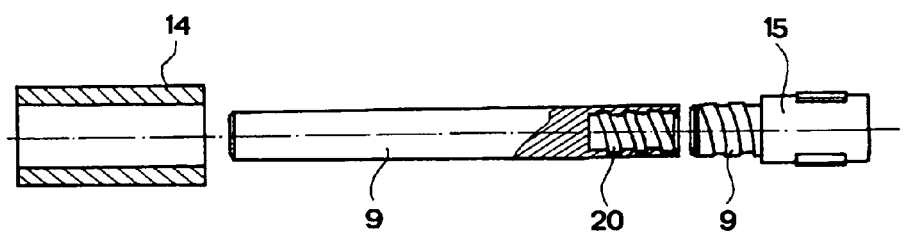

The second guiding and supporting element 14 (FIG. 8) is it also made of a low-friction material such as a bronze alloy, yet it may be coated with a non-stick or self-lubricating layer arranged onto its outside surface 16.

The outside diameter of the second guiding and supporting element 14 is basically coincident with that of the first hole 7, with a minimum clearance allowing the inserting and the sliding thereinside.

On the outside surface 16 there may be provided grooves 17 suitable for receiving flexible gaskets 18, of the O-ring or lip type, to assure the stability of the position of the element 14 (FIG. 14).

Likewise, the same structure may be provided into the internal channel 19 of the second guiding and supporting element 14, to assure the stability of the axis 9 of rotation.

Figure 9:
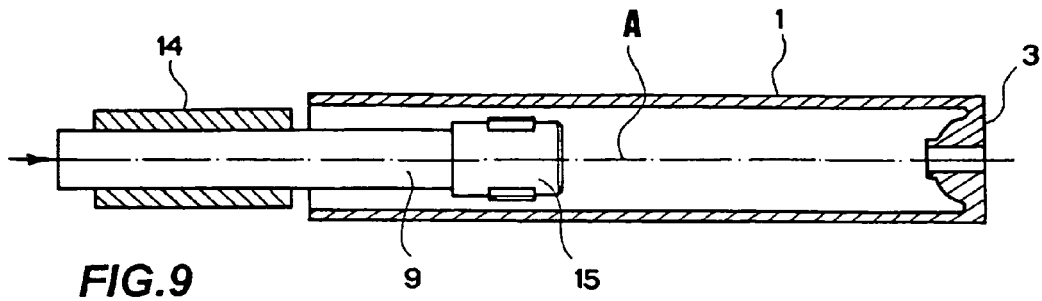

Hence, the machining is carried on by inserting the bottle-boring head 15 inside the hole 7, bringing the head 15 near to the bottom and inserting the second guiding and supporting element 14 into the hole 7, keeping it near to the cutting head 15 (FIG. 9).

Figure 10:
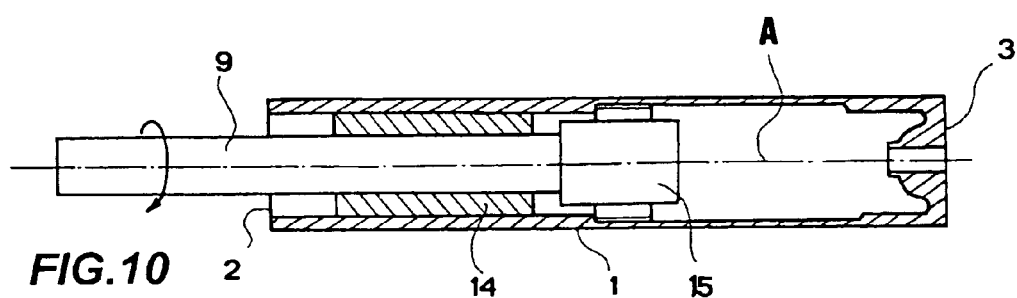

The presence of said element 14 prevents undesired bendings of the tool shaft 9 due to cutting stresses and the transmission of any vibrations. The chip-removal, with the entailed increase of the inside diameter of the hole 7, is carried out from the bottom toward the access end 2 (FIG. 10).

Plural races may be provided, until attaining the desired diameter. For this purpose, there may be provided a set of second guiding and supporting elements of adequate outside diameters. Moreover, it is understood that in the industrial implementation of the present method the guiding and supporting element could be incorporated into the cutting head and/or the mount 20 of the tool shaft 9.

The cutting head 15 for bottle-boring comprises a plurality of cutting elements 21 retractable into the body of the head 15. The retractability is implemented by a drive shaft 22 (not shown) inserted inside the tool shaft 9, suitable for extending or retracting the cutting elements 21.

The control shaft acts on a threaded screw spindle 22 operating on inside ends of cutting edge holding elements 23 having a portion revolving about a bearing 24 on which the cutting element 21 rests in a stable manner.

Figure 11:
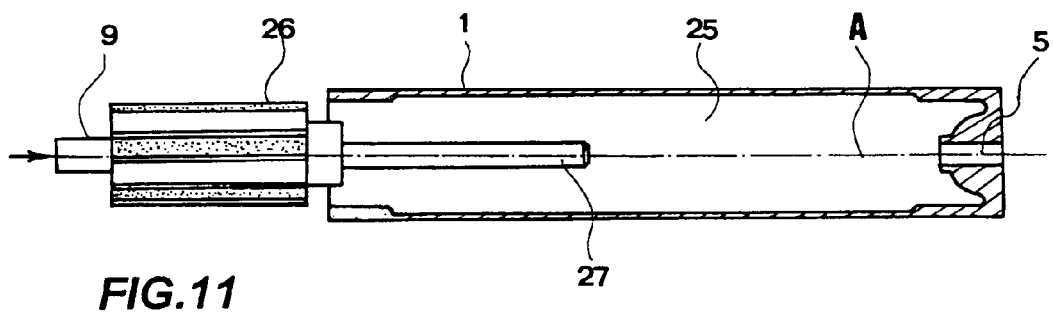
Figure 12:
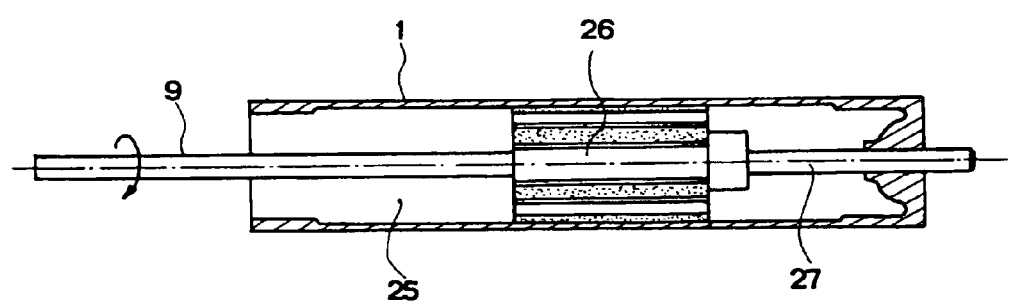
Figure 15:
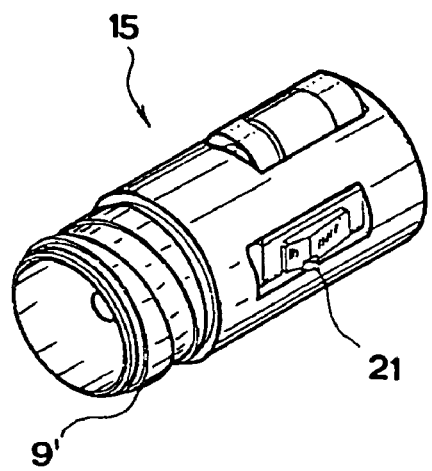
FIGS. 15 to 18 show a perspective view, a top plan view, a cross-sectional view and a longitudinal section view, respectively, of a third detail of the apparatus according to the invention.
Figure 16:
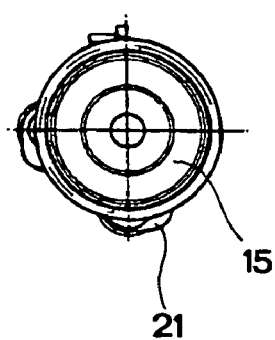
Figure 17:
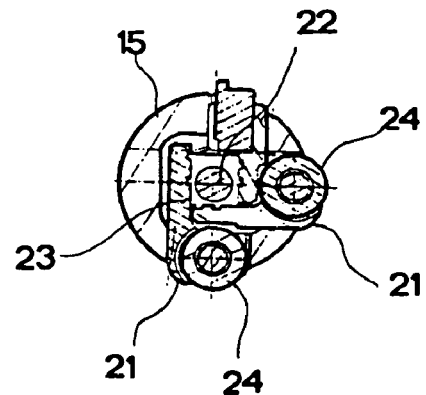
Figure 18:
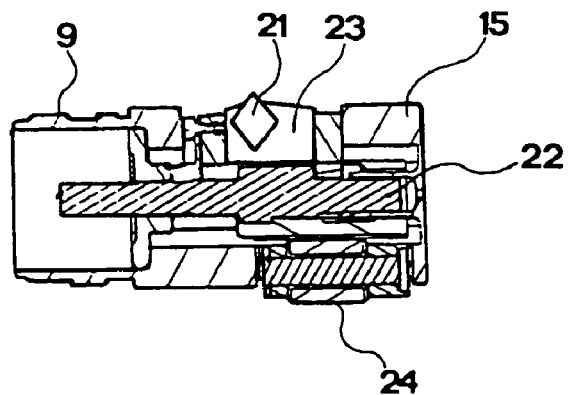

Upon performing the bottle-boring operation, the inside walls of the final hole 25 may be smoothed by a step of lapping (FIG. 11) in which a suitable lapping head 26 is inserted inside the final hole 25 and longitudinally made to slide and rotated (FIG. 12).

Optionally, to keep the distance of the lapping head 26 absolutely longitudinal, there may be provided a third guiding and supporting element 27, analogous to the first one described hereto, working inserted inside the reference hole 5.

In the light of the above-described method, it is evident that for its implementation it is provided an apparatus for carrying out deep holes and/or bottle-boring, in particular borings, with a high ratio between final linear depth and diameter of the hole.

This apparatus comprises at least one tool shaft 9 mounted on a suitable machine for machining, e.g., a lathe.

Moreover, there are provided means for carrying out a reference hole 5, e.g. a drill or the lathe itself used for subsequent machining.

The apparatus further comprises a set of guiding and supporting elements, suitable for being connected with the tool shaft and inserted into a reference hole.

In the exemplary method described above there have been mentioned a first, a second and a third guiding and supporting element 11, 14, 27 reference being made to their description.

Lastly, the apparatus comprises a suitable kit of tools for chip-removal inside a deep hole.

To the above-described method and apparatus for carrying out deep holes a person skilled in the art, in order to satisfy further and contingent needs, may effect several further modifications and variants, all however comprised in the protective scope of the present invention, as defined by the appended claims.

The invention claimed is:

1. A method for carrying out a deep hole and/or bottle-boring with a high ratio between a final linear depth and a diameter of the hole, through a solid workpiece, carried out by a tool covering a longitudinal distance with respect to the workpiece supported by a tool shaft of appropriate length, comprising the steps of:

forming a first reference hole at a bottom end of the workpiece, opposite to an access end of the deep hole to be carried out, having an axis linked to the deep hole to be carried out by a predetermined spatial relationship;

subsequent to the forming step, making a first deep hole of a diameter smaller than the deep hole to be carried out, so that said reference hole and said first deep hole are in spatial communication; and prearranging a guiding and supporting element internal to said first reference hole and connecting thereto at least one tool shaft and a related tool to obtain a contour internal to the deep hole and/or a deep hole having a diameter and an axis according to said predetermined spatial relationship, said guiding and supporting element forming a coaxial extension of said tool shaft;

said first deep hole forming a further reference hole, a further guiding and supporting element being inserted inside the first deep hole at an opposite end of the workpiece, so as to support said tool shaft that passes through the further guiding and supporting element.

2. The method according to claim 1, wherein the workpiece is a solid cylinder, and wherein said first reference hole, of limited depth and predetermined diameter, is exactly coaxial to the solid cylinder.

3. The method according to claim 2, wherein the first deep hole is formed by longitudinally advancing a tool until meeting said first reference hole so that they are communicating and coaxial.

4. The method according to claim 1, said further guiding and supporting element being provided in the form of a bush suitable for being inserted onto the tool shaft, which, in turn, will be provided with a cutting head of bottle-boring type, the outside diameter of the second guiding and supporting element being substantially coincident with that of the first deep hole.

5. The method according to claim 4, wherein the cutting head is brought near to the bottom, by inserting the second guiding and supporting element into the deep hole and keeping it near to the cutting head.

* * * * *